United States Patent [19]

Maisch

[11] 3,998,145
[45] Dec. 21, 1976

[54] COMBINATION GRILLING AND BAKING APPARATUS

[75] Inventor: Emil Maisch, Grafenberg, Germany

[73] Assignee: Stumpp & Schule KG, Beuren, Germany

[22] Filed: Sept. 11, 1975

[21] Appl. No.: 612,294

[30] Foreign Application Priority Data

Sept. 11, 1974 Germany .......................... 2443358

[52] U.S. Cl. .................................. 99/339; 99/376
[51] Int. Cl.² ........................................ A47J 37/06
[58] Field of Search ............. 99/339, 340, 372–380; 219/420, 524, 525

[56] References Cited
UNITED STATES PATENTS

| 1,587,788 | 6/1926 | Morley | 99/376 |
| 1,859,004 | 5/1932 | Reich | 99/339 X |
| 2,899,888 | 8/1959 | Koci | 99/376 X |
| 2,903,959 | 9/1959 | Wagner et al. | 99/376 |
| 3,245,337 | 4/1966 | White et al. | 219/524 X |
| 3,312,161 | 4/1967 | Nanna | 99/377 |
| 3,348,470 | 10/1967 | Swanson | 99/372 X |
| 3,736,859 | 6/1973 | Carlson | 99/372 X |

Primary Examiner—Harvey C. Hornsby
Assistant Examiner—Arthur O. Henderson
Attorney, Agent, or Firm—Edwin E. Greigg

[57] ABSTRACT

A food preparation appliance with two hinged parts, usable as a waffle iron and also as a meat grilling utensil. The two movable parts contain heating rods over which are slipped hollow contact members. Each of these contact members has two different surface patterns, each surface pattern being designed for the specific type of food preparation, i.e., either baking or grilling. The contact members may be removed and turned over so that matching surface patterns face one another.

4 Claims, 3 Drawing Figures

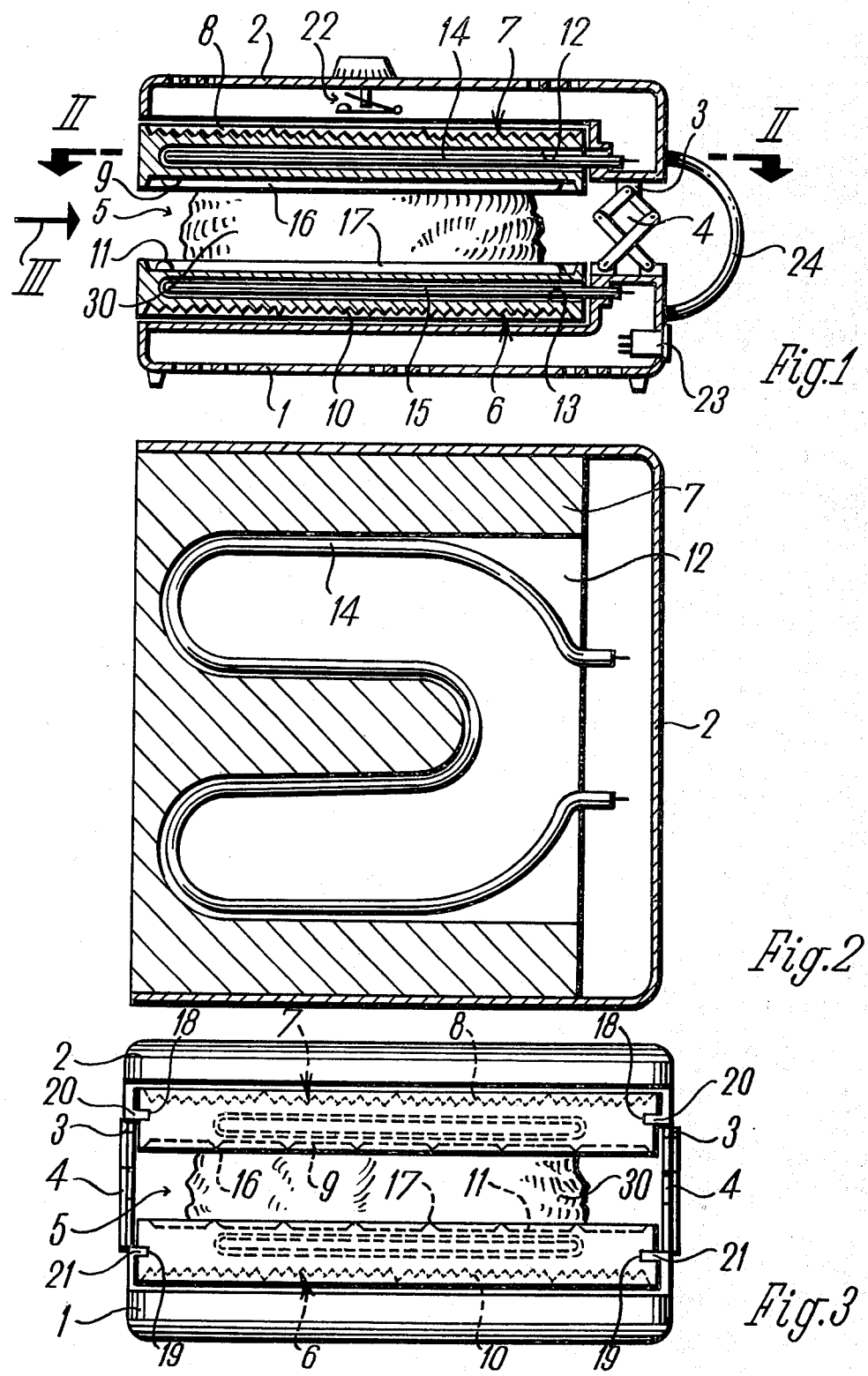

COMBINATION GRILLING AND BAKING APPARATUS

BACKGROUND OF THE INVENTION

The invention relates to a combination grilling and baking appliance in which the food to be grilled or baked is touched by contact members whose surfaces are designed for either a grilling process or a baking process. The contact members may be heated by heating elements and the two contact members may be separated by pivoting to permit introduction of the food to be baked or grilled.

Appliances of the type which serve only one of the two functions, i.e., either grilling or baking, are known by themselves as contact grills and waffle irons.

OBJECT AND SUMMARY OF THE INVENTION

It is a principal object of the invention to provide an apparatus in which both functions, i.e., grilling and baking, can be performed by the same appliance.

Accordngly, the principal object of the invention is attained in that the two opposing surfaces of a particular contact member are provided with different surface patterns which are adapted to the different purposes to which they are to be put. The object is further attained by providing the apparatus with a holding mechanism permitting each member to be held in two distinct positions, corresponding to the two different heating purposes.

Depending on whether grilling of meat or baking of waffles is intended, the two contact members are appropriately inserted so that the contact surfaces corresponding to the desired process face one another. The appropriate foodstuff for grilling or baking, for example meat or a sandwich or waffle batter is then placed between the members. In this manner, the apparatus can perform both described functions selectively. Furthermore, the described apparatus can be cleaned substantially easier than has heretofore been possible because, in a further embodiment of the invention, the contact members are removable from the apparatus and may be washed, for example in a dishwasher.

Further objects and advantages will become more apparent from the ensuing detailed specification of a preferred, although merely exemplary embodiment of the invention, taken in conjunction with the drawing.

BRIEF DESCRIPTION OF THE DRAWING

FIG. 1 is a cross section through an exemplary embodiment of the invention;

FIG. 2 is a section along the line II—II in FIG. 1; and

FIG. 3 is a front elevational view in the direction of the arrow III in FIG. 1.

DESCRIPTION OF THE PREFERRED EMBODIMENT

The combination contact grilling and baking apparatus according to the invention has a lower part 1 and an upper part 2 which are coupled to one another by a pivotable connection 3 in such a manner that the upper part 2 may be pivotably removed from the lower part 1.

The pivotable connection 3 may be a pantograph 4, whose ends are fastened at the upper part 2 and the lower part 1, respectively, and which permits contact of the upper part 2 on the food 30 to be grilled or baked while remaining substantially parallel to the lower part 1. The food is placed in the space 5 between the upper part 2 and the lower part 1 and the pantograph 4 permits positioning these two parts at different vertical distances from one another. Located within the lower part 1 is a contact member 6 and located within the upper part 2 is a similar contact member 7. Each of these members has two surfaces, namely surfaces 8, 9 on the member 7 and surfaces 10, 11 on the member 6. The members have interior voids 12 and 13, respectively, whose shape may be seen in FIG. 2. These voids 12 and 13 serve to receive heating rods 14, 15 when the members are slipped over them (in FIG. 1, this motion will occur from the left). Each member may be installed in two different positions. For example, member 6 may be installed with either surface 10 or 11 facing up. Member 7 would then be so installed that matching surfaces of the members 6 and 7 face one another.

The two contact surfaces of each particular member, i.e., the surfaces 8, 9 of the member 7, and the surfaces 10 and 11 of the element 6 have a different pattern or structure. These different patterns are adapted to different heating or cooking processes: In the exemplary embodiment shown in the drawing, the surfaces 8 and 11 have a waffle design such as is customary for waffle irons, as may be seen in FIG. 1. Thus, if the members 6, 7 are so inserted that the surfaces 8 and 10 face each other, defining the space 5, then the apparatus shown is usable as a waffle iron, i.e., the upper part 2 is flipped up, waffle dough is placed on the contact surface 11 of lower part 1, and subsequently the upper part is pushed down and is lowered far enough so that the contact surface 8, which faces downwardly, comes in contact with the dough, after which the dough may be baked.

The two other contact surfaces 9 and 11 of the elements 7 and 6, respectively, are suitable for a grilling process. These surfaces, as is customary for grilling, may have several mutually parallel ribs 16, 17 (FIG. 3). It would also be feasible to provide grooves instead of ribs. When these two surfaces 9, 11 face each other, as is shown in FIG. 1, then the apparatus may be used as a grill, i.e., food for grilling is plced on the surface 11, after which the upper part 2 is lowered until it makes contact with the food, which is then heated.

Both of the described functions, i.e., grilling and baking, may be performed merely by reverse insertion of the two contact members, i.e., the apparatus can act either as a waffle iron or as a grill. The members 7 and 6 are held in the upper part 2 and the lower part 1, respectively, by grooves 18, 19 engaging guide rails 20, 21, respectively, provided in the upper part 2 and the lower part 1. In the exemplary embodiment shown, these guide rails are formed by bending over the edges of the upper and lower parts of the apparatus. This manner of holding keeps the members from resting on the heating rods and thus prevents the mechanical deformation of the heaters.

The appartus further includes an adjustable temperature control 22, shown only schematically. Such controls, which employ a thermostat to select several temperatures, are known per se and thus need not be described further. In the present case, the control serves to select different temperatures for baking and grilling.

The lower part 1 is provided with a receptacle 23 for a cable, by means of which electric current is provided to the heating rods 14, 15. The electrical connection between the upper and lower parts of the apparatus takes place via a flexible cable 24.

The essential feature of this apparatus is the mobility for selective positioning of contact members, each having two differently configured contact surfaces, one of the surfaces serving for grilling whereas the other serves for baking. This selective positioning can also be performed in some other manner than descried in the preferred embodiment, for example, by pivoting about an axis of merely by turning the member over in a suitable holder.

If the contact surfaces are coated, then the disposition of the heating rods as shown, which permits both surfaces to be uniformly heated in either position, from the inside out, is especially advantageous. If the heating rods are located on the far side of the element, as seen from the foodstuff, the surface of the contact members close to the heating rods would be heated excessively and the surface coating would be damaged.

The apparatus according to the invention combines the function of two known appliances (a contact grill and waffle iron or the like) and therefore has universal utility. It also permits the simple removal of the contact members in a substantially simpler manner than has been possible in previously known contact grills or waffle irons, permitting easy cleaning, for example in a dishwasher.

What is claimed is:
1. An apparatus for grilling and baking foodstuff, comprising:
   A. a housing including a first and a second part, said parts being mutually movable;
   B. contact members, associated with each of said first and second parts, each said contact member having interior voids and two differently patterned contact surfaces, each surface being suitably patterned to conform to a desired heating process, and wherein said apparatus further comprises a heating element associated with said first part and a heating element associated with said second part of said housing, said contact members receiving said heating element in said interior void when installed in said housing; and
   C. holding means, provided on said housing, for alignment and support of said contact members, said holding means further including guide rails which engage channels in said contact members and which permit sliding motion of said contact members in said housing.
2. An apparatus as claim in claim 1, wherein said contact surfaces of said contact members are coated with a layer of synthetic material.
3. An apparatus as claimed in claim 1, further comprising:
   D. thermostatic control means, for adjusting the temperature of said contact members to several different values.
4. An apparatus as claimed in claim 1, including pantographic hinge means, joining said first and said second parts of said housing, permitting separation of said first and said second parts while maintaining mutual parallelism and also permitting mutual pivoting.

* * * * *